United States Patent Office 3,183,264
Patented May 11, 1965

3,183,264
PROCESS FOR THE MANUFACTURE OF UNSATURATED PHOSPHONIC ACID DICHLORIDES
Fritz Rochlitz, Frankfurt am Main, and Herbert Vilcsek, Hofheim, Taunus, Germany, assignors to Farbwerke Hoechst Aktiengesellschaft vormals Meister Lucius & Bruning, Frankfurt am Main, Germany, a corporation of Germany
No Drawing. Filed June 17, 1960, Ser. No. 36,732
Claims priority, application Germany, June 20, 1959, F 28,743; Oct. 27, 1959, F 29,707
5 Claims. (Cl. 260—543)

The present invention relates to a process for the manufacture of unsaturated phosphonic acid dichlorides.

It is known that unsaturated phosphonic acid dichlorides can be obtained by converting the respective unsaturated phosphonic acids or phosphonic acid esters with phosphorus pentachloride or with thionyl chloride. However, the applicability of these processes on an industrial scale is very much impaired by the fact that there must be applied a considerable excess quantity of the cited acid chlorides. Moreover, when using phosphorus pentachloride there is necessarily formed an equivalent amount of phosphorus oxychloride as a secondary product, the separation of which from the unsaturated phosphonic acid dichlorides is difficult.

Now, we have found that hydrogen halide can be split off from the halogen alkane phosphonic acid dichlorides while preserving the grouping

so that unsaturated phosphonic acid dichlorides are obtained in a smooth reaction. This reaction, in which excellent yields are obtained, was unexpected for the chemistry of organic phosphorus compounds.

It could not be anticipated that, when tertiary amines were brought to act upon halogen alkane phosphonic acid dichlorides, or under the rigorous conditions of a thermal splitting, the reaction would proceed entirely without the formation of secondary products.

The splitting off of hydrogen halide from halogen alkane phosphonic acid dichlorides can be effected with the aid of tertiary amines in the presence or absence of organic solvents or diluents, preferably at room temperature, but also at a lower or higher temperature. Beginning with a certain higher range of temperature, the tertiary amines can be dispensed with altogether, i.e., the hydrogen halide can be split off from the halogen alkane phosphonic acid dichloride by the supply of heat. The latter method is especially preferred because it can be carried out in a simple manner. In order to attain yields as high as possible, the reaction is preferably run in the absence of water.

For the splitting off of hydrogen halide by means of tertiary amines there may, practically, be applied all representatives of this class of substances unless their utilization is uninteresting for economic reasons. There may, for example, be used trialkylamines, such as trimethylamine, triethylamine, tributylamine, triamylamine, and dialkyl anilines, such as dimethyl- and diethyl aniline, furthermore tricyclohexylamine, but also heterocyclic bases, such as pyridine, N-methyltetrahydroquinoline, N-ethylmorpholine and others, if necessary, also in mixture with one another.

As a solvent, there has been found suitable quite a variety of inert compounds, such as ether, tetrahydrofurane, dioxane, benzene, toluene, xylene, cymene, chlorobenzene, methylenechloride, chloroform, carbon tetrachloride, phenylcylohexane, dodecylbenzene, dimethylnaphthalene, nonylnaphthalene, amylnaphthalene or diethyldiphenyl. There may also be used mixtures of these compounds as a solvent.

The hydrogen halide can also be split off in the presence of phosphorus trichloride and/or phosphorus oxychloride, i.e. it is not absolutely necessary to isolate, for example, the β-chloroethane phosphonic acid dichloride that can readily be obtained from ethylene, phosphorus trichloride and oxygen. The addition of other solvents is not necessary in this case.

As halogen alkane phosphonic acid dichlorides there are, in general, used those having a straight or branched alkyl group of 2 to 8 carbon atoms, preferably 2 to 4 carbon atoms, substituted by a halogen atom. The alkyl groups can also be substituted by aromatic radicals, such as phenyl or naphthyl groups. The splitting off of the hydrogen halide takes place in an especially smooth manner when the halogen atom in the halogen alkane phosphonic acid dichloride is in β-position to the group of phosphonic acid chloride. In some cases, for example with the 2-chloropropane-2-phosphonic acid dichloride or phenyl-1-chlorethane-1-phosphonic acid dichloride, the halogen atom bound in α-position can be split off by means of the aforementioned tertiary bases in the form of hydrogen halide. The chloroalkane phosphonic acid dichlorides which are easily accessible from a technical point of view are preferred as starting substances as compared with the other halogen alkane phosphonic acid dichlorides.

From among the great number of halogen alkane phosphonic acid dichlorides that can be converted by the splitting off of hydrogen halide to unsaturated phosphonic acid dichlorides by means of tertiary amines, there are mentioned the following: 2-chloroethane-phosphonic acid dichloride, 2-bromoethane-phosphonic acid dichloride, 2-chloropropane-1-phosphonic acid dichloride, 1-chloropropane-2-phosphonic acid dichloride, 2-chloropropane-2-phosphonic acid dichloride, 3-bromopropane-1-phosphonic acid dichloride, 1-chlorobutane-3-phosphonic acid dichloride, 2-chloro-2-methyl-propane-3-phosphonic acid dichloride, phenyl-2-chloroethane-1-phosphonic acid dichloride, phenyl-1-chloroethane-1-phosphonic acid dichloride and 2-chlorobutane-2-phosphonic acid dichloride.

The process can be carried out in a simple manner by dissolving the respective halogen phosphonic acid dichloride in a suitable solvent and gradually adding the respective tertiary base, preferably with continuous agitation. The reaction temperature generally lies within the range of 0° to 80° C., but it can also be higher or lower. The splitting off of hydrogen halide usually sets in at once and can be recognized by the fact that the hydrochloride of the tertiary base separates in the form of a precipitate.

Various methods can be used for the further treatment, depending on the chosen type of the solvent and the base. When a solvent is applied that has a lower boiling point than the respective unsaturated phosphonic acid dichloride obtained after the splitting off of the hydrogen halide, there is first, when the reaction is terminated, filtered the hydrohalic acid salt of the tertiary amine, then the solvent is distilled off and the final product isolated. However, if the splitting off of hydrogen halide is effected in the presence of a solvent having a higher boiling point than the final product, for example phenylcyclohexane, dodecyl benzene or dimethyl naphthalene and, moreover, in the presence of a base forming relatively thermostable salts, it is possible to distill off the unsaturated phosphonic acid dichloride directly after the splitting off of the hydrogen halide. The last-mentioned working method has the advantage that the filtration process can be dispensed with.

It is a further advantage of this last-mentioned working method that the tertiary base and the solvent can be recovered in a simple manner. For this purpose, basic inorganic compounds are admixed to the residue obtained after distilling off the unsaturated phosphonic acid dichloride. For this purpose there are used solutions of hydroxides of an alkali metal or alkaline earth metal of 10 to 30% strength by weight, or solutions of the respective carbonates. After the alkaline treatment, the tertiary base can easily be separated and recovered by distillation.

The temperatures suited for the thermal splitting off of hydrogen halide from halogen alkane phosphonic acid dichlorides, which can be carried out in the absence of tertiary amines, are advantageously situated within the range of 60° C. to 300° C., preferably 100° C. to 270° C. If necessary, temperatures above 300° C. may be applied, especially when the operation is carried out under pressure. In many cases, temperatures below 60° C. may be applied. However, for carrying through the reaction it is of advantage to choose a temperature at which, on the one hand, the hydrogen halide is split off as rapidly and to such an extent as to satisfy all demands, and at which, on the other hand, the desired reaction product does not undergo a thermal decomposition worth mentioning. For example, vinyl phosphonic acid dichloride can be prepared by the process of the present invention from β-chloroethane phosphonic acid dichloride at temperatures ranging from 190° C. to 300° C., the reaction speed being higher the higher the chosen reaction temperature. In the process of the present invention propene pohsphonic acid dichlorides can be obtained from the respective chloropropane phosphonic acid dichlorides, preferably within a range of temperature of 100° C. to 200° C.

Also for the thermal splitting off of hydrogen halide there are, on principle, suited all halogen alkane phosphonic acid dichlorides that have already been mentioned above for the chemical splitting off of hydrogen halide, especially those in which the total number of carbon atoms in the halogen-containing alkyl group does not exceed 4. When choosing the reaction temperature, it has, however, to be considered that, at a given higher temperature, it is only reasonable to convert such halogen alkane phosphonic acid dichlorides as yield stable, unsaturated phosphonic acid dichlorides at the respective temperature.

The thermal splitting off a hydrogen halide from the respective halogen alkane phosphonic acid dichloride can take place, for example, in a manner such that the halogen alkane phosphonic acid dichloride is heated in a suitable reaction vessel under reduced pressure, under normal pressure or also under elevated pressure to a temperature at which the splitting off of hydrogen halide sets in and, if necessary, under reflux, this temperature is maintained until the evolution of hydrogen halide is terminated. During the reaction care must be taken that the hydrogen halide is continuously eliminated from the reaction space. The hydrogen halide can, for example, be expelled by vigorous boiling under reflux, if necessary under reduced pressure. However, there may also be passed through the reaction vessel a dry inert gas, for example nitrogen, carbon-dioxide, rare gases, such as helium, argon etc., by means of which the hydrogen halide formed is removed. In many cases it is advantageous to bind the hydrogen halide by absorption after its removal from the reaction space for which purpose there may be used water, aqueous alkali, or other solid or liquid basic absorption agents. By measuring the quantity of the absorbed hydrogen halide it is easy to control the quantitative course of the reaction. The crude reaction product remaining behind in the reaction vessel can be purified by subsequent distillation, by which process the unsaturated phosphonic acid dichlorides can be obtained in excellent purity and in a large yield.

It is also advantageous to carry out the splitting off of hydrogen halide from the halogen alkane phosphonic acid dichlorides in a manner such that not only the hydrogen halide evolved in the course of the reaction is removed continuously from the reaction space, but also the unsaturated phosphonic acid dichloride obtained as a reaction product is separated continuously by distillation at the rate at which it is formed from the as yet unreacted starting product. In order to achieve a satisfactory separation, it is advantageous to use for this distillation a column having a sufficiently strong separating action. In this manner, there is continuously obtained unsaturated phosphonic acid dichloride at the head of the column in addition to gaseous hydrogen halide. When using packed columns, there are especially suitable, in addition to glass or porcelain fillers, also filling bodies having a large surface, such as clay, kieselguhr, carbon etc.

The splitting off of hydrogen halide can, furthermore, be effected at temperatures situated above the boiling point of the respective halogen alkane phosphonic acid dichloride under normal pressure. In this modification of the process of the invention, the operation is carried out such that the halogen alkane phosphonic acid dicholride to be reacted is passed in the vaporous state through a zone heated at the desired reaction temperature, either separately or together with a dry inert gas, such as nitrogen, carbon dioxide, helium, etc, which gas may be preheated in order to accelerate the process. After the vapor current has traversed the hot reaction space, the reaction product, possibly together with a portion of the as yet unreacted starting product, is separated from the vapor current by cooling. By sequent distillation, pure unsaturated phosphonic acid dichloride can be separated from the possibly existing, but as yet unreacted starting material which is used again for the splitting off of hydrogen halide.

It is furthermore, possible to carry out the reaction in inert solvents the boiling points of which are higher than that of the expected reaction product. Suitable solvents are, for example, dimethyl naphthalene, diethyl diphenyl and other hydrocarbons having a high boiling point. By choosing a suitable solvent it is possible, in many cases, to use said solvent in the distillation of the reaction products as an entraining agent for the unsaturated phosphonic acid dichloride that passes over, while the desired dichloride is subsequently isolated in a pure form by one of the known separating methods.

Finally, the operation can also be carried out such that the halogen alkane phosphonic acid dichloride to be reacted is heated under pressure at temperatures which are situated above its boiling point under normal pressure, and releasing the hot liquid by means of a valve whereby the halogen alkane phosphonic acid dichloride is decomposed into hydrogen halide and unsaturated phosphonic acid dichloride.

Unsaturated phosphonic acid dichlorides which, in the process of the present invention, are obtained in excellent purity and in a large yield, such as the dichlorides of the vinyl-, propene-, butene-, and other alkene phosphonic acids, are valuable intermediate products for a number of syntheses. The respective unsaturated phosphonic acids can be prepared from these intermediate products by hydrolysis with water, aqueous alkalies or acids or the respective esters of the unsaturated phosphonic acids by esterification with alcohols or glycols.

The unsaturated phosphonic acid dichlorides, the free acids and the esters thereof from which said phosphonic acid dichlorides are derived are, furthermore, compounds which activate the polymerization and can be used both for homopolymerization and copolymerization with other suitable monomers or with unsaturated polyesters. The polymers thus obtained have gained importance in the lacquers and plastic materials industries and have also met with considerable interest in the industries producing adhesives and paints. The polymers and, inasmuch as they have a sufficient phosphorus content, also the copolymers are distinguished by their flame-resistant properties.

The following examples serve to illustrate the invention but they are not intended to limit it thereto:

Example 1

720 grams of β-chloroethane phosphonic acid dichloride (4 moles) were disolved in 1.5 l. of absolute ether. At room temperature 405 grams of triethylamine (4 moles) were added to this solution and the mixture was allowed to stand for several hours at room temperature, with agitation. In the course of the reaction, triethylamine hydrochloride was formed which was separated by filtration and washed with a small quantity of absolute ether. The filtrate was freed from the ether, and the vinyl phosphonic acid dichloride distilled under a pressure of 6 mm. of mercury at a boiling point of 54° C. 526 grams of pure vinyl phosphonic acid dichloride were obtained, which represented 91% of the theoretical yield.

Example 2

181.5 grams of β-chloroethane phosphonic acid dichlorid (1 mole) were dissolved in 400 grams of dimethyl naphthalene. 185 grams of tri-n-butylamine (1 mole) were admixed to this solution. Then the mixture was heated at 50° C. for 4 hours. By distillation in vacuo, the vinyl phosphonic acid dichloride was obtained from this reaction mixture, as the first fraction, in a yield of 116 grams, which represented 80% of the theoretical yield. The residue remaining behind during the distillation was not distilled further but treated with an aqueous alkali in order to regenerate the tri-n-butylamine. The organic phase which separated contained both amine and dimethyl naphthalene; it was separated, dried and could then be reused for the preparation of vinyl phosphonic acid dichloride in the manner as described above.

Example 3

20.5 grams of triethylamine were added dropwise, at room temperature, to a solution of 39 grams of chloropropane phosphonic acid dichloride in 200 cu. cm. of absolute ether, and the solution was allowed to stand overnight. Then the precipitate was filtered off with suction and the reaction product washed twice with absolute ether. After expelling the ether, the residue was distilled off. 25 grams of propene phosphonic acid dichloride were obtained, which represented 77% of the theoretical yield.

Example 4

250 parts by weight of β-chloroethane phosphonic acid dichloride (1.38 moles) were heated together with 2 parts by weight of copper acetyl acetonate as a polymerization stabilizer in a flask (capacity: 250 cu. cm.) on which there was installed a distilling column (length: 60 cm.) packed with Raschig rings. The temperature of the heating bath was brought to 265° C. to 275° C. There evolved a continuous current of hydrogen chloride which was withdrawn at the head of the column together with the liquid distillate, with simultaneous separation from the distillate. First there distilled 17 parts by weight of first runnings having a low boiling point, then 178 parts by weight of vinyl phosphonic acid dichloride (1.23 moles) having a boiling point of 165° C. to 170° C. were obtained as a distillate, which represented 89% of the theoretical yield.

However, when the reaction was carried out with β-chloroethane phosphonic acid dichloride that had been highly purified by a preceding careful fractionation in vacuo while proceeding otherwise exactly as described above, there were obtained from 250 parts by weight of β-chloroethane phosphonic acid dichloride (1.38 moles) 195 parts by weight of vinyl phosphonic acid dichloride (1.34 moles), which represented a yield of 97.5% of the theoretical yield.

Example 5

A vessel equipped with reflux condenser, gas inlet tube and thermometer was charged with 195.5 parts by weight of chloropropane phosphonic acid dichloride (1 mole). Then dry nitrogen was introduced in a slow current and the contents of the flask were heated at 200° C. Under vigorous reflux, a continuous, strong evolution of hydrogen chloride set in. The gas mixture consisting of hydrogen chloride and nitrogen leaving the reflux condenser was then passed through a solution consisting of 150 parts by weight of sodium hydroxide in 450 parts by weight of water. The evolution of hydrogen chloride being terminated, the unconsumed quantity of sodium hydroxide in the absorption vessel was measured with 1 N hydrochloric acid by titration, and the reaction product contained in the reaction vessel was purified by distillation. It was found that 39.2 parts by weight of sodium hydroxide (0.98 mole) were consumed, which corresponded to a quantity of 35.67 parts by weight of hydrogen chloride (0.98 mole); the distillation of the reaction product yielded 154 parts by weight of a pure propene phosphonic acid dichloride (0.97 mole) with a boiling point of 84° C. to 86° C. under a pressure of 7 mm. of mercury. Yield: 97% of the theoretical yield. When the propene phosphonic acid dichloride thus obtained was analyzed, the following values were obtained:

Found: saponifiable chlorine, 44.7%; total chlorine, 44.8%.

Calculated: saponifiable chlorine=total chlorine, 44.65%.

We claim:

1. A process for preparing alkene phosphonic acid dichlorides which consists essentially of heating a β-halo alkane phosphonic acid dichloride having 2 to 8 carbon atoms and selected from the group consisting of chloroalkane phosphonic acid dichlorides and bromo-alkane phosphonic acid dichlorides at temperatures of from 60° C. to 300° C., and then isolating the alkene phosphonic acid dichloride formed from the resulting reaction mixture.

2. A process as in claim 1 wherein said β-halo alkane phosphonic acid dichloride is heated at temperatures of from 100° C. to 270° C.

3. A process as in claim 1 wherein said β-halo alkane phosphonic acid dichloride has 2 to 4 carbon atoms.

4. A process for preparing vinyl phosphonic acid dichloride which consists essentially of β-chloroethane phosphonic acid dichloride at temperatures of from 165° C. to 275° C., and then isolating the vinyl phosphonic acid dichloride formed by distilling the resulting reaction product.

5. A process for preparing propene phosphonic acid dichloride which consists essentially of heating chloropropane phosphonic acid dichloride at 200° C. under a blanket of nitrogen, absorbing the escaping vapors of hydrogen chloride in a sodium hydroxide solution, and isolating the propene phosphonic acid dichloride formed from the remaining reaction mixture by distillation.

References Cited by the Examiner

UNITED STATES PATENTS

| | | | |
|---|---|---|---|
| 2,388,657 | 11/45 | Long | 260—544 |
| 2,495,799 | 1/50 | Woodstock | 260—543 |

OTHER REFERENCES

Kabachnik et al.: "Chem. Abstracts," vol. 54, p. 10834F, May-June (1960) citing: Izvest. Akad. Nauk S.S.S.R., Otdel, Khim. Nauk (1959), pp. 2142–2145.

Noller et al.: J.A.C.S., vol. 53, pages 1185–1186 (1931).

Saborovskii et al.: "Zhur. Obschei Khim," vol. 29, pp. 2152–4 (1959).

LORRAINE A. WEINBERGER,
*Acting Primary Examiner.*

LEON ZITVER, CHARLES B. PARKER, *Examiners.*